United States Patent
Streeky et al.

(10) Patent No.: US 6,900,281 B2
(45) Date of Patent: May 31, 2005

(54) GAS PHASE OLEFIN POLYMERIZATIONS USING DUAL DONOR CATALYST SYSTEMS

(76) Inventors: Jerome A. Streeky, 155 Ashcroft Dr., Bolingbrook, IL (US) 60490; David A. Kreider, 820 Crescent St., Wheaton, IL (US) 60187; Chi-Hung Lin, 9 Long Bow Ct., Cockeysville, MD (US) 21030; Mark G. Reichmann, 3890 Andrews Crossing, Roswell, GA (US) 30075

( * ) Notice: Subject to any disclaimer, the term of this patent is extended or adjusted under 35 U.S.C. 154(b) by 0 days.

(21) Appl. No.: 10/324,727

(22) Filed: Dec. 19, 2002

(65) Prior Publication Data

US 2003/0149196 A1 Aug. 7, 2003

Related U.S. Application Data

(60) Provisional application No. 60/345,255, filed on Jan. 3, 2002.

(51) Int. Cl.$^7$ .............................................. C08F 210/00
(52) U.S. Cl. ...................... 526/348; 526/90; 526/116; 526/123.1; 526/88
(58) Field of Search ........................... 526/125.3, 123.1, 526/124.1, 348, 90, 116, 901, 88

(56) References Cited

U.S. PATENT DOCUMENTS 6,057,407 A    5/2000   Lin et al. ................... 526/128
6,111,039 A  * 8/2000   Miro et al. ................. 526/128
2001/0041219 A1 * 11/2001  Durand et al. ........... 427/248.1

FOREIGN PATENT DOCUMENTS

EP    0498603    8/1992
EP    0601496    6/1994

OTHER PUBLICATIONS

Walas, Stanley, M., *Chemical Process Equipment Selection and Design*, 1988, pp. 567–569, Butterworth Publishers, USA.

Caracotsios, Dr. Mike, "Theoretical Modeling of Amoco's Gas Phase Horizontal Stirred Bed Reactor for the Manufacturing of Polypropylene Resins," *Chemical Engineering Science*, 1992, pp. 2591–2596, vol. 47, No. 9–11, Pergamon Press Ltd, Great Britain.

* cited by examiner

Primary Examiner—Ling-Siu Choi

(57) ABSTRACT

A gas-phase olefin polymerization process in a plug flow reactor uses a catalyst system containing a magnesium halide supported titanium-containing component, an organoaluminum component, and at least one external electron donor component; in the process a first external donor component is added to the reactor at an injection point axially near an injection point for the supported transition metal containing component, and at least a second external donor component is added to the reactor axially downstream from the injection point for the first external donor component.

20 Claims, No Drawings

GAS PHASE OLEFIN POLYMERIZATIONS USING DUAL DONOR CATALYST SYSTEMS

CROSS-REFERENCE TO RELATED APPLICATIONS

This application claims the benefit of U.S. Provisional Application No. 60/345,255, filed Jan. 3, 2002, which is incorporated by reference herein.

FIELD OF THE INVENTION

This invention is directed to olefin polymerizations, and more particularly, to an improved method for producing polyolefins including highly stereoregular polypropylene homopolymers and polypropylene copolymers having improved melt flow rates and, consequently, suitable processing properties. Still more particularly, the invention is directed to an improved vapor phase process for the polymerization of olefins carried out in a single horizontally disposed reactor wherein a plurality of external electron donors is employed to provide highly stereoregular olefin polymers and copolymers with broadened molecular weight distribution and melt flow rates.

BACKGROUND OF THE INVENTION

The process technology for the manufacture of polypropylene (PP) has evolved with improvements in catalyst technology, from complex slurry processes using an inert hydrocarbon diluent, to simpler bulk processes using liquid propylene diluent, to even more simplified gas phase processes.

The polymerization catalysts conventionally employed in these processes have generally been Ziegler-Natta type catalysts. Typical catalyst systems include a high activity, magnesium halide supported, transition metal containing component, an aluminum alkyl component, and preferably an external modifier or electron donor component.

The physical properties of homopolymers and copolymers of propylene formed by typical Ziegler-Natta polymerization typically are dependent on the stereoregularity of the polymer itself. Highly stereoregular polymers are crystalline, have desirably high flexural moduli and display high melting points. The addition of various electron donor materials to Ziegler-Natta catalysts is known to influence the degree of stereoregularity in polypropylene homopolymers and copolymers. Generally, a Ziegler-Natta catalyst, such as, for example, a magnesium chloride-supported, titanium-based catalyst, can be used in combination with any of a number of electron donor materials, each of which will lead to a specific level of stereoregularity and melt flow rate (MFR) control.

The molecular weight, and thereby the MFR, of the polyolefin produced with a particular catalyst system typically is regulated by the hydrogen level in the reactor. One of the properties of electron donors is that the stereoregulating capability and hydrogen response of a given electron donor are directly and inversely related. This relationship between stereoregularity and hydrogen response poses a problem. When highly stereoregulating donors are employed, it is necessary to use a high reactor hydrogen level to produce polyolefin, for example, polypropylene, having a molecular weight and MFR falling within the range usually desired for a particular use. A more hydrogen-responsive, lower stereoregulating donor will provide polypropylene with the equivalent MFR at a lower hydrogen level, but the polypropylene will be less stereoregular, having increased amorphous polypropylene content. Thus, in processes that have a hydrogen partial pressure limitation, the final achievable MFR will be determined by the choice of electron donor, which in turn determines the level of polypropylene stereoregularity in the final product.

Olefin polymerization processes, in which homopolymer composition is controlled through sequential addition of two different electron donor materials, are disclosed in the art. Such processes are carried out using two polymerization reactors connected in series. Homopolymer is produced in the first reactor with a Ziegler-Natta catalyst system, including a first electron donor, and passed to the second reactor, where a second electron donor is added. Although the catalyst in the second reactor will thus include a mixture of two donors, the more stereoregulating donor will control the composition of the product. The second donor thus will be selected to be more stereoregulating than the first electron donor material. The hydrogen levels in each reactor, and thereby the MFR for the product of each polymerization step, may be controlled differently as desired.

The sequential use of two donors in this manner provides a homopolymer product mixture having a broad molecular weight distribution and a broad compositional distribution of the homopolymer components. The MFR of the homopolymer will be substantially that which would be predicted for a mixture comprising the weighted average of the independently produced donor products. However, the product characteristics will be closer to those of a homopolymer formed in the presence of the more stereoregulating second donor alone. That is, the crystallinity and flexural modulus of the resulting homopolymer are higher than expected from the weighted average of the two independent donor products.

Separate reactors are used for conducting prior art polymerization processes employing a Ziegler-Natta catalyst system and a plurality of external donors. When conducted in a single reactor, whether in solution or in bulk, or in the gas phase as a continuously stirred tank reactor or fluid bed process, product composition will be controlled by the more stereoregulating external donor, also termed the dominant donor. For example, as disclosed in U.S. Pat. No. 6,111,039, incorporated in its entirety herein by reference, bulk liquid polymerizations conducted in a single stirred reactor using a mixture of two external donors produce polymer with a molecular weight distribution and melt flow rate very near that obtained using the dominant donor alone, even when as little as 10% of the dominant donor is present. The more stereoregulating donor is less hydrogen-responsive; hence, higher reactor hydrogen levels are needed to control molecular weight when such donors are present. Obtaining a product mixture containing the desired level of the product of the less stereoregulating donor having the desired molecular weight thus has heretofore required the use of separate reactors. U.S. Pat. No. 6,111,039 and PCT Published Application WO 99/20663 describe using different donors in different stages of an olefin polymerization process.

Although the use of a plurality of electron donors allows control of tacticity, molecular weight distribution and MFR in propylene polymerizations, the necessity for using a plurality of reactors to achieve the desired result increases energy consumption, raises production costs, and requires greater investment in equipment and facilities. A single reactor process for the polymerization of olefins to provide polyolefins, including propylene homopolymers and propylene copolymers having improved melt flow rates and molecular weight distributions together with high tacticity, would thus provide significant advantages and be a substantial improvement in the art.

SUMMARY OF THE INVENTION

An improved Ziegler-Natta olefin polymerization process uses a plurality of electron donors as external donors, which may be carried out in a single polymerization reactor with control of tacticity, molecular weight distribution, and melt flow rate (MFR) to provide highly stereoregular propylene homopolymers and propylene-based copolymers. Generally, the process will be carried out in a horizontal, subfluidized stirred-bed, gas-phase reactor, more particularly described and operating under substantial plug-flow reactor conditions, the donors being added at separate points in the reactor stream. Preferably, two such external donors will be employed, the second donor being selected to be more stereoregulating than the initial or first external donor material.

The invention may be further described and characterized as directed to high tacticity polypropylene homopolymers and polypropylene copolymers with a broad molecular weight distribution and high melt flow rate.

DESCRIPTION OF THE PREFERRED EMBODIMENT(S)

Generally described, the improved process for the gas-phase polymerization of olefins according to the invention includes contacting a polymerizable olefin monomer or mixture of monomers with a Ziegler-Natta polymerization catalyst system in a gas-phase, plug-flow reactor useful for the vapor phase, typically isobaric polymerization of olefin monomers.

Gas-phase or vapor-phase olefin polymerization processes are disclosed generally in "Polypropylene Handbook" pp. 297–298, Hanser Publications, NY (1996), and more fully described in "Simplified Gas-Phase Polypropylene Process Technology" presented in Petrochemical Review, March, 1993. The teachings of these publications are hereby incorporated in their entirety by reference. Gas-phase reactor processes are also described in U.S. Pat. Nos. 3,957,448; 3,965,083; 3,971,786; 3,970,611; 4,129,701; 4,101,289; 3,652,527; 4,003,712; 4,287,327; 4,130,699; and 4,921,919, all incorporated by reference herein.

The term plug-flow reactor, as commonly understood in the process arts, refers to reactors for conducting a continuous fluid flow process without forced mixing at a flow rate such that mixing occurs substantially only transverse to the flow stream. Agitation of the process stream may be desirable, particularly where particulate components are present; if done, agitation will be carried out in a manner such that there is substantially no back-mixing. Perfect plug flow cannot be achieved because the diffusion will always lead to some mixing, the process flow regime being turbulent, not laminar. Since perfect plug flow conditions are not achieved in practice, a plug flow reactor system sometimes is described as operating under substantially plug flow conditions. Ordinarily, plug flow reactors may be disposed horizontally or vertically, and are designed such that they are longer than they are wide (the ratio of the longitudinal dimension to transverse dimension is greater than 1 and preferably greater than 2), the end located at the front of the process stream being referred to as the reactor head or front end, the exit port or take-off being located at the opposite or back end of the reactor.

The terms "gas-phase polymerization" or "vapor-phase polymerization" refer to processes in which the monomer or monomers are polymerized from the gaseous state in the reactor.

Generally described, the preferred reactor system employed in the practice of the invention will comprise an agitated, horizontally disposed plug flow reactor vessel to which olefin monomer and catalyst components can be added and which contain a bed of forming polymer particles which are agitated or stirred by a mechanical agitator. The plug flow characteristic of a reactor having a given volume will improve at increasing L (length) over D (diameter) ratios; hence, the plug flow reactor vessel will still more preferably be a cylindrical horizontal subfluidized gas phase reactor having an L over D ratio of at least 2 to 1, more preferably from about 3 to 1 to about 6to 1.

The agitator is designed to give a slow and regular turnover of the entire polymer bed contained in the reactor but without causing significant backward or forward movement of the particles. The polymer solid continually produced in the reactor traverses the length of the reactor to the exit port essentially because of polymer build-up in the reactor bed, not as a result of the stirring agitation. The agitation should be sufficient to provide the desired heat and mass transfer between liquid, solid and gas without causing the finer particles of the polymer bed to be thrown up in large quantities into the space above the bed. Such reactor systems are more fully described in the art, for example in U.S. Pat. No. 4,101,289.

The Ziegler-Natta polymerization catalyst systems disclosed in the art for use in such processes comprise a transition metal compound component and a co-catalyst component, preferably an organoaluminum compound. Optionally, the catalyst system may include minor amounts of catalyst modifiers and electron donors. Typically, catalyst/co-catalyst components are added together or separately through one or more valve-controlled ports in the reactor vessel, located at the front of the process stream. The catalyst components may be added to the process stream through a single feedline or, more preferably, they may be injected separately through different apertures to prevent plugging in the feedlines.

Olefin monomer may be provided to the reactor through a recycled gas and quench liquid system in which unreacted monomer is removed as off-gas, partially condensed and mixed with fresh feed monomer, and injected into the reactor vessel. Hydrogen may be added to control molecular weight. A quench liquid is injected into the process stream in order to control temperature. In propylene polymerization, the quench liquid can be liquid propylene. In other olefin polymerization reactions, quench liquid can be a liquid hydrocarbon such as propane, butane, pentane or hexane, preferably isobutane or isopentane. Depending on the specific reactor system used, quench liquid can be injected into the reactor vessel above or within the bed of polymer particles.

More particularly described, the transition metal compounds useful as a catalyst system component usually are compounds of Groups IVB, VB, and VIB of the Periodic Table (Groups 4, 5, and 6 in the new IUPAC nomenclature). Preferably, the transition metal compound is a solid titanium-containing compound. The polymerization catalyst systems conventionally employed in gas-phase processes include a high activity supported solid titanium-based catalyst component, a trialkylaluminum activator or cocatalyst component and an external modifier or donor component. Separately, the catalyst components are inactive; thus, the catalyst and activator components may be suspended in propylene and fed to the reactor as separate streams without initiating polymer formation in the feed lines. Suitable solid supported titanium catalyst systems are described in U.S.

Pat. Nos. 4,866,022, 4,990,479 and 5,159,021, incorporated herein by reference. Briefly, titanium-based supported Ziegler-Natta catalyst can be obtained by: (1) suspending a dialkoxymagnesium compound in an aromatic hydrocarbon that is liquid at ambient temperatures; (2) contacting the dialkoxymagnesium-hydrocarbon composition with a titanium halide and with a diester of an aromatic dicarboxylic acid; and (3) contacting the resulting functionalized dialkoxymagnesium-hydrocarbon composition of step (2) with additional titanium halide.

Although the chemical structure of the catalyst components described herein is not presently known, the components preferably contain from about 1 to about 6 wt. % titanium, from about 10 to about 25 wt. % magnesium, and from about 45 to about 65 wt. % halogen. Preferred catalyst components made according to this invention contain from about 1.0 to about 3.5 wt. % titanium, from about 15 to about 21 wt. % magnesium and from about 55 to about 65 wt. % chlorine.

The amount of catalyst to be employed varies depending on choice of polymerization technique, reactor size, monomer to be polymerized, and other factors known to persons of skill in the art, and can be determined on the basis of the examples appearing hereinafter. Typically, catalysts of this invention are used in amounts ranging from about 0.2 to 0.01 milligrams of catalyst to gram of polymer produced.

The co-catalyst component preferably is an organoaluminum compound that is halogen free. Suitable halogen-free organoaluminum compounds include, for example, alkylaluminum compounds of the formula $AlR_3$, where R denotes an alkyl radical having 1 to 10 carbon atoms, such as, for example, trimethylaluminum, triethylaluminum (TEA) and triisobutylaluminum (TIBA). Additional compounds that are suitable for use as a co-catalyst are readily available and amply disclosed in the prior art, including U.S. Pat. No. 4,990,477, which is incorporated herein by reference. Co-catalysts suitable for use with supported magnesium catalyst components improve the efficiency of the catalyst system and the quality control of the polymer product. In such catalyst systems, the co-catalyst scavenges impurities from the polymerization system, activates the catalyst and provides initiation of a polymer chain.

The reactor includes means for introducing catalyst or a catalyst component into a plurality of sections contained therein, thereby allowing a controlled introduction of catalysts and quench liquid directly into and onto the stirred, subfluidized bed of forming polymer solid and polymerizing monomer from the vapor phase in and over such bed. As the solid polymer produced in the process builds up, it traverses the reactor length and is continuously removed by passing through a take-off barrier situated at the exit end of the reactor.

The reactor may optionally be compartmented, each compartment of the reactor being physically separated by a dividing structure so constructed that it serves to control vapor intermixing between compartments but allows free polymer particle movement from one compartment to the other in the direction of the take-off. Each compartment may include one or more polymerization sections, optionally separated by weirs or other suitably shaped baffles to prevent or inhibit gross backmixing between sections.

Monomer or monomer mixture and, optionally, hydrogen are introduced largely or wholly underneath the polymer bed, and quench liquid is introduced onto the surface of the bed. Reactor off-gases are removed along the top of the reactor after removing polymer fines as completely as possible from the off-gas stream. Such reactor off-gases are led to a separation zone whereby the quench liquid is at least, in part, separated, along with any further polymer fines and some of the catalyst components, from polymerization monomer and hydrogen, if used. Monomer and hydrogen are then recycled to inlets spaced along the various polymerization sections of the reactor located generally underneath the surface of the polymer bed. A portion of the quench liquid, including the further polymer fines, is taken off the separation zone and, in major part, returned to inlets spaced along the top of the reactor compartment. A second small portion of separated quench liquid, free of polymer fines and catalyst components, may be fed into a catalyst make-up zone for catalyst diluent so that fresh quench liquid need not be introduced for that purpose. Provision may be made in the reactor to introduce the catalyst components and quench liquid at different rates into one or more of the polymerization sections to aid in the control of the polymerization temperatures and polymer production rates. Catalyst components may be added on the surface or below the surface of the bed.

The overall reactor temperature range for polymerization depends upon the particular monomer which is being polymerized and the commercial product desired therefrom and, as such, are well known to those skilled in the art. In general, the temperature range used varies between about 40° C. up to about the softening temperature of the bed.

The recycle system of the process is designed so it, together with the reactor, operates essentially isobaric. That is, preferably, there is no more than a ±10 psi (±70 kPa) pressure change in the recycle system and reactor, more preferably ±5 psi (±35 kPa), which is the normal pressure variation expected from operations.

The total polymerization pressure is composed of the polymerizable monomer pressure, vaporized quench liquid pressure, and hydrogen pressure and such total pressure typically may vary from above about atmospheric to about 600 psig (4200 kPa). The individual partial pressures of the components making up the total pressure determine the rate at which polymerization occurs, the molecular weight, and the molecular weight distribution of the polymer to be produced.

Electron donors are employed with Ziegler-Natta catalyst systems to control stereoregularity by controlling the relative amounts of isotactic and atactic polymers (which may be measured by boiling heptane extraction or nmr pentad analysis) in the product. The more stereoregular isotactic polymer typically is more crystalline, which leads to a material with a higher flexural modulus. Such highly crystalline, isotactic polymers also display lower melt flow rates, as a consequence of a reduced hydrogen response of the electron donor in combination with the catalyst during polymerization. The preferred electron donors of the present invention are external electron donors used as stereoregulators in combination with Ziegler-Natta catalysts. Therefore, the term "electron donor", as used herein, refers specifically to external electron donor materials, also referred to as external donors.

Suitable external electron donor materials include organic silicon compounds, typically are silanes having a formula, $Si(OR)_n R'_{4-n}$, where R and R' are selected independently from $C_1$–$C_{10}$ alkyl and cycloalkyl groups and n=1–4. Preferably, the R and R' groups are selected independently from $C_2$ to $C_6$ alkyl and cycloalkyl groups such as ethyl, isobutyl, isopropyl, cyclopentyl, cyclohexyl, and the like. Examples of suitable silanes include tetraethoxysilane (TEOS), dicyclopentyldimethoxysilane (DCPDMS), diisopropyldimethoxysilane (DIPDMS), diisobutyldimethoxysilane (DIBDMS), isobutylisopropyldimethoxysilane (IBIPDMS), isobutylmethyldimethoxysilane (IBMDMS), cyclohexylmethyldimethoxysilane (CHMDMS), di-tert-butyldimethoxysilane (DTBDMS), n-propyltriethoxysilane (NPTEOS), isopropyltriethoxysilane (IPTEOS), octyltriethoxysilane (OTEOS), and the like. The use of organic silicon compounds as external electron donors is described, for example, in U.S. Pat. Nos. 4,218,339; 4,395,360; 4,328,122; and 4,473,660, all of which are incorporated herein by reference. Although a broad range of compounds are known generally as electron donors, a particular catalyst may have a specific compound or groups of compounds with which it is especially compatible and which may be determined by routine experimentation.

The stereoregulating capability and hydrogen response of a given external donor typically are inversely related. For example, the DIPDMS donor has a substantially lower hydrogen response than the TEOS donor, but produces a significantly higher level of stereoregularity than TEOS. Because DIPDMS is more stereoregulating, at an equal reactor hydrogen pressure, DIPDMS will provide polymer with a higher level of crystallinity and higher molecular weight, and therefore lower MFR, than will the lesser stereoregulating TEOS donor. Typically, alkyl trialkoxy silanes and especially alkyl triethoxy silanes demonstrate a higher level of hydrogen response and lower stereoregulating capability. Thus, triethoxy silanes such as TEOS and OTEOS may be used in a first injection point according to this invention. Similarly, dialkyl or dicycloalkyl dimethoxysilanes, such as DIBDMS, DCPDMS, and DIPDMS, are more stereodirecting and are especially useful for injection through a downstream port. However, it has been determined that NPTEOS is more hydrogen responsive than DIBDMS or DIPDMS, but maintains extractable levels intermediate between polymer produced using DIBDMS and DIPDMS. Further, a branched alkyl silane typically produces a more stereodirecting effect. For example, use of NPTEOS typically produces a higher MFR product than use of IPTEOS. TEOS is the most preferable silane injected through the first injection point.

In a preferable embodiment of this invention a silane having a formula, $Si(OR)_3R'$ or $Si(OR)_4$, where R and R' are selected independently from $C_1$–$C_{10}$ alkyl and cylcoalkyl groups is injected in a first catalyst injection point, while a silane having a formula, $Si(OR)_2R'_2$, where R and R' are selected independently from $C_1$–$C_{10}$ alkyl and cylcoalkyl groups is injected in a second injection catalyst point. The preferable R group for the first silane is ethyl and the preferable R group for the second silane is methyl.

The improvement, according to the invention, lies in the use of a plurality of external electron donors to control product stereoregularity and molecular weight distribution. The catalyst components, including a first external donor or front donor, will be injected, together or separately, at the head of the process stream; the additional donor or donors will be injected into the process stream at points located axially downstream from the catalyst injection port. The external donors will be sequenced such that the least stereoregulating external donor will be injected, preferably together with the cocatalyst, near the catalyst injection port; the most stereoregulating or dominant external donor, having a lower hydrogen response, the back donor, will be injected into the process stream axially downstream therefrom. Where more than two such donors are employed, the intermediate donors will preferably be selected to be more stereoregulating than the front donor, and less stereoregulating than the back donor. The intermediate stereoregulating donors will be injected into the process stream at locations disposed axially along the process stream between the injection points for the front donor and the back donor. Mixtures of donors may be added through a port if the stereoregulating power of the mixture components essentially is the same.

Two donors may be readily ranked with respect to stereoregulating characteristics, when used in combination with a particular catalyst system, by carrying out separate olefin polymerizations (two polymerizations using catalyst systems modified with each of the two donors alone and a third modified with a mixture of the two donors) and then comparing the MFR and molecular weight distributions for each. The product of the mixed donor polymerization will have MFR and molecular weight parameters similar to those of the more stereoregulating donor, conveniently termed the dominant donor. Test polymerizations may be carried out, for example, by conducting simple bulk polymerizations under comparable conditions, using an autoclave or pressure bottle reactor. One process suitable for such determinations is more fully characterized and described in U.S. Pat. No. 6,111,039, wherein DCPDMS is demonstrated by the patentees to be the dominating donor, relative to TEOS, for a magnesium chloride-supported titanium catalyst.

Although, as stated above, a mixture of donors generally will show the stereoregulating capability of the dominant donor, it is possible to use a mixture of donors with similar stereoregulating capability. Further, amounts of a dominating donor may be used in small enough proportion in a mixture of donors to affect the resin properties without totally masking the effect of the other donor. For example, U.S. Pat. No. 5,652,303, incorporated by reference herein, describes use of mixture of 90% NPTEOS and 10% DCPDMS to produce higher MFR resin with extractable levels similar to that produced by DCPDMS. In the present invention, such mixtures of donors may be injected in one or more catalyst injection ports to produce desired product properties.

The improved process of this invention provides substantial control over split of isotactic and atactic polymer components, product molecular weight distribution (Mw/Mn) and MFR.

The product of the invented process will be a mixture comprising the polymer produced by the catalyst in combination with the first donor and the polymers resulting from catalyst in combination with the first donor and subsequently added donors. For example, when two external donors are employed, the product mixture will comprise low tacticity polymer produced by polymerizing in the presence of the first external donor and higher tacticity product produced by polymerizing in the presence of two external donors. Because of the plug flow character of the reactor, the proportion of each product in the mixture will be determined by the location of the injection of the second external donor into the process stream, relative to the overall length of the polymerization process stream. Injecting the second external donor into the process stream at a point equidistant between the injection point of the first donor and the exit port divides the process stream into two reaction zones substantially equal in length. The amounts of "single donor" polymer and "dual donor" polymer produced will be determined by the residence time in each zone, i.e. the time required for polymer particles to traverse each of the zones. Residence time will depend upon several parameters including particle size and polymer production rate, and may vary. The reactor hydrogen level being constant, the molecular weights and molecular weight distributions (Mw/Mn) for the single donor and dual donor products will differ because of the difference in hydrogen response of the donors.

Similarly, when three external donors are used, the second and third donors being injected at different downstream locations, three reaction zones are created. The resulting product mixture will comprise "single donor" polymer, "two donor" polymer and "three donor" polymer, the amounts of each again determined by the residence time in each zone.

The location of the injection point for the second donor, and for subsequent donors, if employed, will be selected to provide the desired proportion of first donor and mixed donor polymers in the product mixture. For a plug flow reactor with internal length L, embodiments wherein the injection point for the second donor is located at least 0.25L, typically from 0.25L to about 0.75L, and preferably 0.4L to about 0.6L downstream from the injection point for the first external donor, may be found particularly useful.

The improved process of the invention described herein is illustrated, but not limited, by the following Examples and Comparative Runs.

EXAMPLES

To demonstrate the process of this invention and to make comparative runs, propylene polymerizations in the following Examples and Comparative Runs were performed in a 5.6 cubic foot (0.16 m$^3$), continuous, horizontal, cylindrical gas-phase reactor, measuring 16 inches (0.41 m) in diameter and 48 inches (1.22 m) in length, based on that described in U.S. Pat. No. 3,965,083. The reactor was equipped with an on-gas port for recycling reactor gas through a condenser and back through a recycle line to the recycle nozzles in the reactor. Propylene liquid was used as the quench liquid to help remove the heat generated in the reactor during the polymerization. During operation, polypropylene powder produced in the reactor bed passed over a weir and was discharged through a powder discharge system into a secondary closed vessel blanketed with nitrogen. The polymer bed was agitated by paddles attached to a longitudinal-shaft within the reactor that was rotated at about 40 rpm.

The polymerizations were conducted using a magnesium halide supported, titanium halide containing, high activity catalyst component produced in accordance with U.S. Pat. No. 4,866,022, the teachings of which are incorporated herein by reference. Triethylaluminum (TEA) was used as the co-catalyst at an Al/Mg ratio of 6. The amount of silane modifier was controlled in the polymerizations such that the Si/Ti ratio was in the range of 1 to 9.

Generally, catalyst preparation, storage and transfer operations will be conducted using carefully dried reagents and vessels in a dry box containing an inert gas atmosphere such as, for example, dry nitrogen or argon.

The titanium-containing catalyst was introduced into the reactor as a 1.5 wt. % slurry in hexane through a liquid propylene-flushed catalyst addition nozzle. A mixture of the front donor TEOS and 20% TEA in hexane at an Al/Si of 6 and Al/Mg molar ratios, indicated in Table I, were fed separately to the reactor through a liquid propylene-flushed co-catalyst addition nozzle. The latter nozzle was generally located near the catalyst injection port for Examples C-2 and C-3 and Example 1, and axially a short distance, typically less than about 20% and preferably less than about 10% of the total reactor length, downstream from the catalyst injection port for Examples C-1 and C-4.

The back donor DIPDMS in hexane was fed to the reactor at an Al/Si molar ratio of 6 through a liquid propylene-flushed co-catalyst addition nozzle located axially approximately 50% of the total reactor length downstream from the catalyst injection port.

The reactor temperature was maintained at approximately 65–70° C. and the reactor pressure was maintained at approximately 335 psig (2400 kPa). Process details and product parameters for homopolypropylene produced in Example 1 and Comparative Runs C-1–C-4 are summarized in Table I.

TABLE I

| Example (Run) | C-1 | C-2 | C-3 | C-4 | 1 |
|---|---|---|---|---|---|
| Co catalyst: | TEA | TEA | TEA | TEA | TEA |
| Front Donor: | TEOS | TEOS | none | DIPDMS | TEOS |
| Al/Si | 6 | 6 | — | 6 | 6 |
| Al/Mg | 7 | 7 | — | 9.8 | 6 |
| Back Donor: | none | none | DIPDMS | none | DIPDMS |
| Al/Si | | | 6 | N/A | 6 |
| $H_2/C_3^=$ | 0.0138 | 0.0454 | 0.0454 | 0.112 | 0.0454 |
| MFR g/10 min. | 101 | 322 | 39 | 95 | 104 |
| Mw/Mn | 4.2 | 4.1 | 5.3 | — | 5.1 |
| NMR Tacticity | | | | | |
| mmmm | 94.1 | 94.6 | 95.1 | — | 94.9 |
| mmmr | 1.8 | 1.7 | 1.5 | — | 1.6 |

It will be seen from Comparative Runs C-1 and C-2 that, in a polymerization system employing TEOS alone as the donor, a moderate increase in the $H_2/C_3^=$ ratio (i.e., moderately increasing the hydrogen level) substantially increases the melt flow rate (MFR-ASTM 1238 condition L) of the resulting homopolypropylene, though both polymers have the same relatively narrow molecular weight distribution (Mw/Mn).

Polymer produced with DIPDMS alone (Run C-3), using substantially the same conditions and hydrogen level as were used in Run C-2, has substantially lower melt flow together with a broadened molecular weight distribution and slightly greater tacticity. Because of the much lower hydrogen sensitivity of the DIPDMS donor, attaining a high melt flow using DIPDMS alone may be accomplished only by using a very high level of hydrogen (see Run C-4).

According to the process of this invention, controlling MFR and Mw/Mn may be readily accomplished by employing two external donors.

It will be seen from a consideration of the MFR and Mw/Mn values for the homopolymer produced employing the two donor system (Example 1) that the improved process of this invention provides homopolypropylene having a high melt flow rate (MFR). Further, although the homopolymers of Example 1 and Run C-1 have substantially the same MFR, the molecular weight distribution (Mw/Mn) for the homopolymer of Example 1 was significantly broadened without requiring an increase in hydrogen level.

Further control of the final product mix may be accomplished through choice of injection points for the donors. The composition of the final product may be controlled over a wide range by selecting the relative positions of the donor injection nozzles, or by varying the relative feed rates of the two donors, while maintaining a constant $H_2/C_3^=$ ratio. In prior art processes employing a single donor, transitioning the MFR from high to low requires modifying the $H_2/C_3^=$ ratio. This generally will be accomplished by venting monomer from the reactor, resulting in an undesirable increase in monomer consumption.

It will thus be recognized that the improved process of the invention provides a method whereby olefin polymers having a wide range of melt flow rates and broad molecular weight distributions, and which are tailored as desired, may be produced in a single reactor.

The method of this invention may also be useful in the production of impact copolyolefins. Generally, impact copolymers (ICP) have been produced by employing sequential gas phase reactors. The output of the first reactor, generally a homopolymer such as homopolypropylene, will be fed directly into a second reactor together with a second olefin monomer or mixture of monomers and polymerized to produce the ICP.

In Example 2 and Comparative Run C-5, ICP resins were produced using two sequential gas phase reactors, substantially following the process outlined in U.S. Pat. No. 3,957,448.

In Example 2, homopolypropylene was produced in the first reactor according to the invention using TEOS as the front or initial donor, followed by DIPDMS as the more dominant back or second donor. The resulting homopolymer containing the catalyst and mixed donors was then fed to the second reactor together with a monomer mixture of ethylene and propylene containing approximately 10% ethylene.

In Comparative Run C-5, homopolypropylene was produced in the first reactor using only a TEOS donor and fed to the second reactor together with an ethylene-propylene monomer mixture containing approximately 10% ethylene.

The first reactor temperature was maintained at approximately 65–70° C., and the reactor pressure was maintained at approximately 335 psig (2400 kPa). The second reactor temperature was maintained at approximately 65–70° C., and the reactor pressure was maintained at approximately 318 psig (2300 kPa).

Process details and product parameters for homopolypropylene and ICP produced in Example 2 and comparison Example C-5 are summarized in the following Table II.

TABLE II

| Ex. No. | C-5 | 2 |
|---|---|---|
| First Reactor | | |
| Co-catalyst | TEA | TEA |
| Front Donor | TEOS | TEOS |
| Al/Si | 6 | 6 |
| Al/Mg | 7 | 6 |
| Back Donor | none | DIPDMS |
| Al/Si | N/A | 6 |
| $H_2/C_3^=$ | 0.0138 | 0.0454 |
| MFR g/10 min | 101 | 104 |
| Mw/Mn | 4.2 | 5.1 |
| NMR Tacticity | | |
| mmmm | 94.1 | 94.9 |
| Second Reactor | | |
| $H_2/C_3^=$ | 0.0022 | 0.0082 |
| $C_2^=/C_3^=$ | 0.113 | 0.127 |
| MFR g/10 min | 72 | 66 |
| Mw/Mn | 5.0 | 5.9 |

It will be seen that the ICP obtained according to the invention (Example 2) had a broadened molecular weight distribution when compared with the ICP produced conventionally (Run C-5) together with a desirably high MFR.

It will be understood that the process of the invention, when used in conjunction with sequential reactors, as in Example 2, may be further modified by injecting further donors, and possibly additional catalysts, into the second reactor at selected points, and by maintaining a hydrogen/monomer ratio in the second reactor which is different from that employed in the first reactor. These further modifications would provide the artisan with a high degree of control over critical product parameters and particularly over MFR, Mw/Mn and tacticity of the resulting homopolymer or copolymer or ICP resin.

Thus, the invention will be seen to be directed to an improved Ziegler-Natta olefin polymerization process for the production of alpha olefin homopolymers and copolymers, and preferably for the gas-phase polymerization of propylene. The improvement comprises sequential injection of a plurality of external donors to modify and control stereoregularity, molecular weight distribution, and MFR of the polymer. The invented process may be conveniently conducted in a single gas-phase, plug-flow reactor useful for the vapor-phase, essentially isobaric, polymerization of olefin monomers, and is preferably horizontally disposed. The external donors will be injected at different points along the process stream and sequenced such that the least stereoregulating external donor will be injected, preferably together with the cocatalyst, near the catalyst injection port, and the more stereoregulating or dominant external donor will be injected into the process stream axially downstream therefrom. Varying the relative locations of the external donor injection points along the process stream may afford further means for control over the final composition of the polymer product mixture.

Homopolymer produced according to the invented process may be fed directly to a second reactor together with additional monomer or mixture of monomers to produce an ICP resin typically comprising from 51 to 99 mole % propylene homopolymer and from 1 to 49 mole % of a copolymer of propylene and ethylene. ICP resin produced in such a process may contain from 1 to 25 mole % ethylene. Further modification of the process for producing ICP, including carrying out the process using a plurality of external donors in each of the two or more sequential reactors, may be useful for providing additional control over product stereoregularity and molecular weight distribution.

Still further modifications that will extend the scope of the preferred embodiments of the present invention, as described above, may be made with minimal experimentation, and such modifications will be readily apparent to one skilled in the art. The preferred embodiments of the present invention set forth herein are therefore not intended to limit the scope of the present invention, which is defined and set forth by the following claims.

That which is claimed is:

1. A gas-phase process for polymerization of olefins in a plug flow reactor, in which at least one olefin monomer is contacted with a catalyst system comprising a magnesium halide supported titanium-containing component, an organoaluminum component, and at least one external electron donor component, wherein catalyst system components are added through injection points positioned axially along the reactor, comprising:

adding a first external donor component to the reactor at an injection point axially near an injection point for the supported transition metal containing component, and adding at least a second external donor component to the reactor axially downstream from the injection point for the first external donor component.

2. The process of claim 1 wherein the second external electron donor is more stereoregulating than the first electron donor.

3. The process of claim 1 wherein the first and second external electron donor compounds are organic silicon compounds having a formula $Si(OR)_nR'_{4-n}$, where R and R' are selected independently from $C_1$–$C_{10}$ alkyl and cycloalkyl groups and n=1–4.

4. The process of claim 3 wherein the first and second external electron donor compounds are selected from the group consisting of tetraethoxysilane, dicyclopentyldimethoxysilane diisopropyldimethoxysilane diisobutyldimethoxysilane, isobutylisopropyldimethoxysilane di-tert-butyldimethoxysilane, n-propyltriethoxysilane, isopropyltriethoxysilane, and octyltriethoxysilane.

5. The process of claim 1 wherein the first external electron donor is tetraethoxysilane.

6. The process of claim 1 wherein the second external electron donor is dicyclopentyldimethoxysilane, diisopropyldimethoxysilane, diisobutyldimethoxysilane, or isobutylisopropyldimethoxysilane.

7. The process of claim 1 wherein the olefin monomer is propylene.

8. The process of claim 7 wherein propylene is polymerized with a minor amount of ethylene, $C_{4+}$ alpha olefins, or mixtures thereof.

9. The process of claim 1 wherein the plug flow reactor is a cylindrical horizontal, subfluidized stirred-bed reactor in which the ratio of length to diameter is greater than 2.

10. The process of claim 1 wherein the injection point of the second external donor component is at least 25% of the length of the reactor downstream from the injection point of the first external donor component.

11. A gas-phase process for polymerization of olefins in a cylindrical, horizontal, subfluidized stirred-bed plug flow reactor, in which at least one olefin monomer is contacted with a catalyst system comprising a magnesium halide supported titanium-containing component, an organoaluminum component, and at least one external silicon-containing electron donor component, wherein catalyst system components are added through injection points positioned axially along the reactor, comprising:

adding a first external donor component to the reactor at an injection point axially near an injection point for the supported transition metal containing component, and adding at least a second external donor component, which is more stereoregulating than the first electron donor, to the reactor at least 25% of the length of the reactor axially downstream from the injection point for the first external donor component.

12. The process of claim 11 in which at least 95 mole % of the olefin monomer is propylene.

13. The process of claim 12 in which the first electron donor is tetraethoxysilane.

14. The process of claim 13 in which the second electron donor is dicyclopentyldimethoxysilane, diisopropyldimethoxysilane, diisobutyldimethoxysilane, or isobutylisopropyldimethoxysilane.

15. The process of claim 14 wherein the injection point of the second external donor component is between 25% to 75% of the length of the reactor downstream from the injection point of the first external donor component.

16. The process of claim 15 wherein the injection point of the second external donor component is between 40% to 60% of the length of the reactor downstream from the injection point of the first external donor component.

17. The process of claim 11 wherein a second cylindrical horizontal, subfluidized stirred bed plug flow reactor is operated in series with the first reactor.

18. The process of claim 11 wherein the organoaluminum component is a trialkylaluminum.

19. The process of claim 18 wherein the organoaluminum component is a triethylaluminum.

20. The process of claim 17 in which a mixture of propylene and ethylene is polymerized in the second reactor.

* * * * *